(12) United States Patent
Kim et al.

(10) Patent No.: US 11,490,574 B2
(45) Date of Patent: Nov. 8, 2022

(54) FLOWER WATER RECEIVER

(71) Applicant: REPUBLIC OF KOREA(MANAGEMENT : RURAL DEVELOPMENT ADMINISTRATION), Jeollabuk-do (KR)

(72) Inventors: Jae Soon Kim, Jeollabuk-do (KR); Seung Won Han, Jeollabuk-do (KR); Na Ra Jeong, Jeollabuk-do (KR); Gyung-Mee Kim, Daejeon (KR); Sun-Jin Jeong, Jeollabuk-do (KR); Hye-Sook Jang, Gyeonggi-do (KR)

(73) Assignee: REPUBLIC OF KOREA(MANAGEMENT : RURAL DEVELOPMENT ADMINISTRATION), Jeollabuk-Do (KR)

( * ) Notice: Subject to any disclaimer, the term of this patent is extended or adjusted under 35 U.S.C. 154(b) by 42 days.

(21) Appl. No.: 16/761,243

(22) PCT Filed: Oct. 1, 2018

(86) PCT No.: PCT/KR2018/011664
§ 371 (c)(1),
(2) Date: May 2, 2020

(87) PCT Pub. No.: WO2019/088461
PCT Pub. Date: May 9, 2019

(65) Prior Publication Data
US 2020/0352110 A1  Nov. 12, 2020

(30) Foreign Application Priority Data
Nov. 3, 2017 (KR) .......................... 10-2017-0145851

(51) Int. Cl.
*A01G 9/04* (2006.01)
*A01G 27/00* (2006.01)
*A01G 27/06* (2006.01)

(52) U.S. Cl.
CPC ............. *A01G 9/047* (2013.01); *A01G 9/042* (2013.01); *A01G 27/005* (2013.01);
(Continued)

(58) Field of Classification Search
CPC ........ A01G 9/042; A01G 9/047; A01G 27/00; A01G 27/003; A01G 27/005; A01G 27/006; A01G 27/008; A01G 27/04; A01G 27/06
See application file for complete search history.

(56) References Cited

U.S. PATENT DOCUMENTS 1,391,353 A * 9/1921 Wells ..................... A47G 7/041
47/71
3,769,748 A * 11/1973 Goldring ................ A01G 27/04
71/64.11
(Continued)

FOREIGN PATENT DOCUMENTS

| CN | 2464062 | 12/2001 |
| CN | 201185584 | 1/2009 |

(Continued)

OTHER PUBLICATIONS

International Search Report for PCT/KR2018/011664 dated Mar. 29, 2019 and its English translation from WIPO (now published as WO2019/088461).
(Continued)

*Primary Examiner* — Timothy D Collins
*Assistant Examiner* — Nicholas Leo Seneczko
(74) *Attorney, Agent, or Firm* — Ladas & Parry, LLP

(57) ABSTRACT

A flower water receiver includes a main body formed in a cylindrical shape with an open top to store water, a self-
(Continued)

watering module installed on a central portion of a bottom of the main body to form water by condensing moisture in the air, a support formed on a part of the main body in the vicinity of a circumference of the self-watering module to support a circumference of a lower portion of a flower pot placed in an upper portion of the main body, and a wick support member, when the flower pot is placed in the upper portion of the main body, supporting a wick configured to absorb water in the lower portion of the main body and transfer the water to the inside of the flower pot, to be inserted into an inside of a drain hole of the lower portion of the flower pot.

7 Claims, 5 Drawing Sheets

(52) U.S. Cl.
CPC ......... *A01G 27/006* (2013.01); *A01G 27/008* (2013.01); *A01G 27/06* (2013.01)

(56) References Cited

U.S. PATENT DOCUMENTS

| | | | | |
|---|---|---|---|---|
| 3,783,555 | A * | 1/1974 | Peters | A01G 27/06 47/79 |
| 4,109,415 | A * | 8/1978 | Hall | A01G 27/04 211/113 |
| 5,341,596 | A * | 8/1994 | Kao | A01G 27/04 47/79 |
| 6,125,580 | A | 10/2000 | Fan | |
| 6,131,334 | A * | 10/2000 | Fan | A01G 27/04 47/81 |
| 6,345,470 | B1 * | 2/2002 | Slaght | A01G 27/02 47/79 |
| 6,584,730 | B1 * | 7/2003 | Mai | A01G 27/02 47/79 |
| 8,065,834 | B2 * | 11/2011 | Eckert | A01G 9/028 47/79 |
| 9,010,021 | B1 * | 4/2015 | Rettger, II | A01G 27/06 47/79 |
| 9,392,756 | B1 * | 7/2016 | Conrad, Jr. | A01G 27/008 |
| 9,930,840 | B1 * | 4/2018 | Gergek | A01G 27/008 |
| 2008/0314062 | A1 * | 12/2008 | Ritchey | F25B 39/00 62/119 |
| 2009/0064576 | A1 * | 3/2009 | Sugarek | A01G 27/04 47/81 |
| 2009/0229180 | A1 * | 9/2009 | Rich | A47G 7/041 47/71 |
| 2012/0073320 | A1 * | 3/2012 | Seoane | B01D 5/0015 62/291 |
| 2012/0198767 | A1 | 8/2012 | Hansen | |
| 2015/0143748 | A1 * | 5/2015 | Donnelly | A01G 27/06 47/79 |
| 2017/0254053 | A1 * | 9/2017 | Kumar | E03B 3/28 |
| 2020/0305356 | A1 * | 10/2020 | Hansord | A01G 9/028 |
| 2020/0316518 | A1 * | 10/2020 | Johnson | B01D 53/268 |
| 2020/0352110 | A1 * | 11/2020 | Kim | A01G 9/042 |

FOREIGN PATENT DOCUMENTS

| | | |
|---|---|---|
| CN | 202085530 | 12/2011 |
| CN | 203087083 | 7/2013 |
| CN | 103385124 | 11/2013 |
| CN | 105724200 | 7/2016 |
| CN | 205830486 | 12/2016 |
| CN | 205830487 | 12/2016 |
| DE | 100 10 155 | 8/2001 |
| EP | 2 727 459 | 5/2014 |
| JP | 63-160527 | 7/1988 |
| JP | 5-219845 | 8/1993 |
| JP | 7-147851 | 6/1995 |
| JP | 2003-287316 | 10/2003 |
| JP | 2005-131549 | 5/2005 |
| JP | 2014-508538 | 4/2014 |
| KR | 20-0238318 | 10/2001 |
| KR | 20-0254369 | 11/2001 |
| KR | 10-0316084 | 12/2001 |
| KR | 10-2011-0135475 | 12/2011 |
| KR | 10-2013-0106913 | 10/2013 |
| KR | 10-2013-0123002 | 11/2013 |
| KR | 10-2013-0125500 | 11/2013 |
| KR | 10-1398536 | 5/2014 |
| KR | 10-2016-0018966 | 2/2016 |
| KR | 10-2017-0025051 | 3/2017 |
| NL | 7607320 | 1/1977 |

OTHER PUBLICATIONS

Written Opinion of the International Searching Authority for PCT/KR2018/011664 dated Mar. 29, 2019 and its English machine translation by Google Translate (now published as WO2019/088461).

International Preliminary Report on Patentability (Chapter I) for PCT/KR2018/011664 dated May 5, 2020 and its English translation from WIPO (published as WO 2019/088461).

Office Action dated Oct. 25, 2021 for Chinese Patent Application No. 201880084259,5 and its English translation from Global Dossier.

Extended European Search Report dated Jul. 23, 2021 for European Patent Application No. 18872012.2.

Office Action dated Jun. 8, 2021 for Japanese Patent Application No. 2020-544720 and its English translation provided by the Applicant's foreign counsel.

Notice of Allowance dated Oct. 5, 2021 for Japanese Patent Application No. 2020-544720 and its English translation from Global Dossier.

\* cited by examiner

FLOWER WATER RECEIVER

CROSS-REFERENCE TO RELATED APPLICATIONS

This application is the U.S. national phase of International Patent Application No. PCT/KR2018/011664 filed on Oct. 1, 2018, which claims the priority to Korean Patent Application No. 10-2017-0145851 filed in the Korean Intellectual Property Office on Nov. 3, 2017, the entire contents of which are incorporated herein by reference.

TECHNICAL FIELD

The present disclosure relates to a flower water receiver for watering of a flower pot.

BACKGROUND ART

One of the most important factors in plant growth is moisture. Therefore, as for planting plants, it is important to prevent the difficulty, which may occur in the growth of the plant, by securing a watering system in advance.

Recently, a flower water receiver has been introduced and the flow port tray is configured to supply water to the inside of a flower pot that is supported by an upper portion of the flower water receiver. Therefore, through the flower water receiver, it is possible to reduce time and labor caused by the watering.

Korean utility model registration No. 20-0254369 discloses an example of the flower water receiver.

The flower water receiver disclosed in the patent document is configured to resupply water, which is discharged through a drain hole in a lower portion of the flower pot after water is supplied to a planting space in the flower pot with which soil is filled, to the inside of the flower pot by using a pump and a nozzle.

However, because the conventional flower water receiver receives water for watering from the outside, the conventional flower water receiver is difficult to use in a region where there is little precipitation or in an environment in which a watering system is difficult to install.

In addition, as for the flower water receiver configured to transfer water stored therein to the flower pot by using a pump and a nozzle, it is required to connect the nozzle to the flower pot in a state in which the flower pot is positioned in the upper portion of the flower water receiver, which may cause the difficulty in the installation related to the watering of the flower pot.

DISCLOSURE

Technical Problem

The present disclosure is directed to providing a flower water receiver capable of watering of a flower pot by itself and capable of simplifying a structure for supplying water to the flower pot.

Technical Solution

One aspect of the present disclosure provides a flower water receiver including a main body formed in a cylindrical shape with an open top so as to store water, a self-watering module installed on a central portion of a bottom of the main body to form water by condensing moisture in the air, a support formed on a part of the main body in the vicinity of a circumference of the self-watering module so as to support a circumference of a lower portion of a flower pot placed in an upper portion of the main body, and a wick support member, in a process of in which the flower pot is placed in the upper portion of the main body, configured to support a wick configured to absorb water in the lower portion of the main body and transfer the water to the inside of the flower pot, to be inserted into an inside of a drain hole in a central portion of the lower portion of the flower pot.

The support may include a plurality of support ribs configure to protrude from the bottom of the main body, which is in the vicinity of the circumference of the self-watering module, to the upper side to extend radially outward from the inside, and arranged to be spaced apart from each other in a circumferential direction.

The flower water receiver may further include a fixing bracket configured to cover at least one portion of the self-watering module so as to fix the self-watering module to the bottom of the main body, and the wick support member may be integrally fixed to the fixing bracket.

The fixing bracket may be an upper cover configured to cover at least one portion of an upper portion of the self-watering module, and the wick support member may be fixed to the upper cover and the upper cover in the vicinity of a circumference of the wick support member supports the lower portion of the flower pot in the vicinity of the drain hole.

The self-watering module may include a thermo element, and a cooling member provided in a cooling portion of the thermo element.

The self-watering module may include a heat radiating member provided in a heat radiating portion of the thermo element and a cooling fan configured to cool the heat radiating member.

A vent hole may be formed on a side surface of the main body.

Advantageous Effects as for a flower water receiver, a self-watering module configured to form water by condensing moisture in the air is installed integrally with a main body, and a wick for supplying the water formed by the self-watering module to the inside of a flower pot is inserted into the inside of a drain hole, which is provided in a center of a lower portion of a flower pot, in a process in which the flower pot is placed in an upper portion of the main body. Therefore, the flower water receiver may perform watering of the flower pot by itself and simplify a structure for supplying water to the flower pot.

MODES OF THE INVENTION

Figure 1:
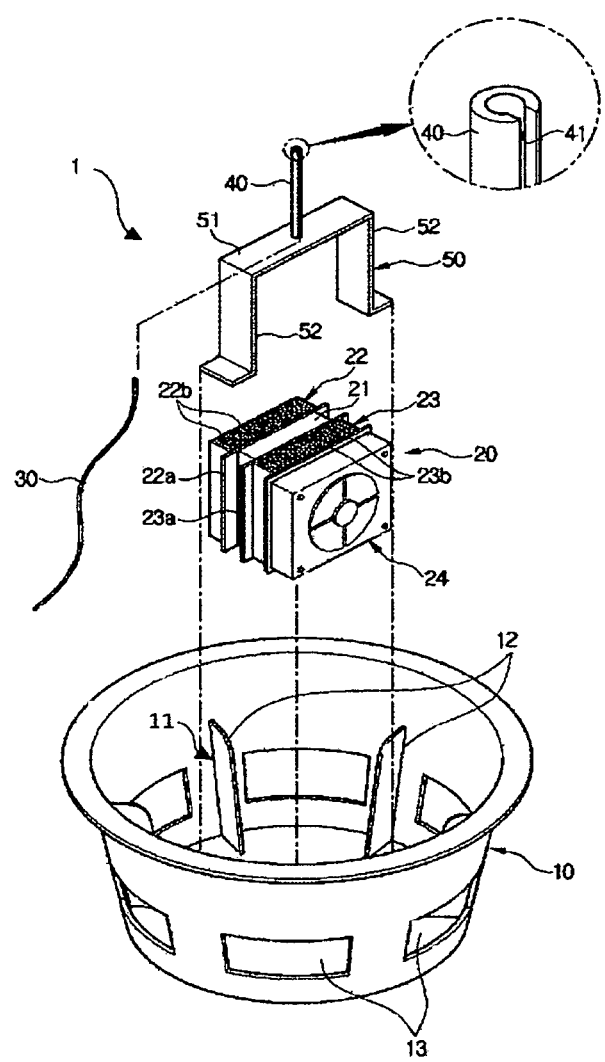
FIG. 1 is an exploded-perspective view of a flower water receiver according to one embodiment of the present disclosure.

The disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Throughout the drawings, to clarify the disclosure, a part irrelevant to the description may be omitted, and the size of components may be exaggerated to help understanding.

As illustrated in FIGS. 1 to 5, according to one embodiment, a flower water receiver 1 is configured to collect water, which is supplied to a flower pot 2 and then discharged through a drain hole 2a provided in a lower portion of the flower pot 2. The flower water receiver 1 includes a main body 10 provided in the form of a cylinder with an open top to store water, and a self-watering module 20 installed in a central portion of a bottom of the main body 10.

The main body 10 may be provided in a hollow cylindrical shape with an open top, and formed of various materials such as plastic and porcelain.

The self-watering module 20 is configured to form water by condensing moisture in the air. The self-watering module 20 may be fixed to the central portion of the bottom of the main body 10, thereby being formed integrally with the main body 10.

The self-watering module 20 may include a thermo element 21, a cooling member 22 provided in a cooling portion of the thermo element 21, a heat radiating member 23 provided in a heat radiating portion of the thermo element 21, and a cooling fan 24 configured to cool the heat radiating member 23.

The thermo element 21 is an element in which two different metals are combined or an N-type semiconductor and a P-type semiconductor are mutually bonded, and the thermo element 21 has the characteristic of endothermic reaction and exothermic reaction on both metal surfaces when DC current is applied. One surface of the thermo element 21 in which the endothermic reaction occurs may form the cooling portion, and the other surface of the thermo element 21 in which the exothermic reaction occurs may form the heat radiating portion.

The cooling member 22 and the heat radiating member 23 may be formed of a metal having the high thermal conductivity such as aluminum. The cooling member 22 and the heat radiating member 23 may be mounted to the cooling portion and the heat radiating portion, respectively. The cooling fan 24 may be mounted to the heat radiating member 23 to cool the heat radiating member 23 when the heat radiating member 23 is driven. Therefore, the self-watering module 20 may be provided as a single piece in which the thermo element 21, the cooling member 22, the heat radiating member 23 and the cooling fan 24 are integrally connected to each other.

A power cable (not shown) or a battery (not shown) for applying power may be connected to the thermo element 21 and the cooling fan 24.

The cooling member 22 may include a cooling plate 22a in contact with the thermo element 21 and a plurality of cooling fins 22b protruding from the cooling plate 22a. The heat radiating member 23 may include a heat radiating plate 23a mounted to the thermo element 21 and a plurality of a heat radiating fin 23b protruding from the heat radiating plate 23a.

Therefore, when the thermo element 21 and the cooling fan 24 are driven, the cooling member 22 may be cooled by a heat absorbing portion in which the endothermic reaction occurs, and the heat radiating member 23 may radiate heat by being cooled by the cooling fan 24. Accordingly, moisture in the air may be condensed on a surface of the cooling member 22 and thus water may be formed.

As the water condensed on the surface of the cooling member 22 is guided to the lower side along the surface of the cooling member 22 and dropped by its own weight, the water may be stored in the lower portion of the main body 10.

The cooling fin 22b may protrude from one surface of the cooling plate 22a while the cooling fin 22b elongates in the vertical direction of the cooling member 22. In addition, the plurality of the cooling fin 22b may be spaced apart from each other in the width direction of the cooling plate 22a.

Therefore, as the water condensed on the surface of the cooling fin 22b is guided to the lower side along the surface of the cooling fin 22b by its own weight and dropped to the bottom of the main body 10, the water may be stored in the lower portion of the main body 10.

Despite of a region where there is little precipitation or in an environment in which a watering system is difficult to install, the flower water receiver 1 may secure the water, which is to be supplied to the flower pot 2, by itself.

A support 11 configured to support a circumference of the lower portion of the flower pot 2, which is placed in the upper side of the main body 10, is formed on a part of the main body 10 that is around the circumference of the self-watering module 20.

The support 11 may include a plurality of support ribs 12 protruding from the bottom of the main body 10 to the upper side.

At the circumference of the self-watering module 20, each support rib 12 may be arranged to extend radially outward from the inside. The plurality of support ribs 12 may be arranged to be spaced apart from each other along the circumferential direction.

Therefore, because the circumference of the lower portion of the flower pot 2, which is positioned in the upper side of the main body 10, is supported by the plurality of support ribs 12, the flower pot 2 may be stably supported by the main body 10 and the self-watering module 20 may be protected from the load of the flower pot 2.

In addition, because the plurality of support ribs 12 is extended radially outward from the inside, it is possible to stably support the flower pot 2 having various diameter size lower portions through the support 11 of the main body 10.

A vent hole 13 may be provided on the side surface of the main body 10 so that the air may be smoothly supplied toward the self-watering module 20 even when the opening of the upper portion of the main body 10 is mostly covered by the flower pot 2.

A plurality of vent holes 13 may be spaced apart along the side circumference of the main body 10. The plurality of vent holes 13 may be spaced apart in the upper side from the bottom of the main body 10 so that the water produced by the self-watering module 20 is stored in the lower portion of the main body 10 without being directly discharged to the outside through the vent hole 13.

In addition, the water, which is produced by the self-watering module 20 and guided to the lower portion of the inside of the main body 10, may be absorbed through a wick 30 and then transferred to the inside of the flower pot 2. The flower water receiver 1 includes a wick support member 40, and the wick support member 40 is configured to support the wick 30 to allow the wick 30 to be inserted into the inside of the drain hole 2*a*, which is in the central portion of the bottom of the flower pot 2, in a process in which the flower pot 2 is placed in the upper portion of the main body 10.

The wick support 40 may allow the wick 30 to be inserted into the inside of the drain hole 2*a* in a process in which the flower pot 2 is placed in the upper portion of the main body 10, and thus it is possible to sufficiently simplify a structure in which the water is supplied from the lower portion of the main body to the inside of the flower pot 2.

The self-watering module 20 may be fixed to the bottom of the main body 10 through a fixing bracket 50. The fixing bracket 50 may be provided to cover at least a portion of the self-watering module 20 and the wick support 40 may be provided integrally with the fixing bracket 50.

The fixing bracket 50 may include an upper cover 51 configured to cover at least a portion of the upper portion of the self-watering module 20, and a pair of bottom supports 52 configured to support between the upper cover 51 and the bottom of the main body 10 so to be supported by the opposite portions of the self-watering module 20.

The fixing bracket 50 may be fixed to the main body 10 in such a way that an end of the pair of bottom supports 52 is fixed to the bottom of the main body 10 through a fastening means such as a fixing bolt or an adhesive. Therefore, the fixing bracket 50 may be fixed to the main body 10 in a state in which the self-watering module 20 is prevented from being moved.

The upper cover 51 may have the same height as the upper end of the support rib 12, and the wick support member 40 may be fixed to stand on the central portion of the upper cover 51. Accordingly, the upper cover 51 around the wick support member 40 may support the lower portion of the flower pot 2 around the drain hole 2*a* in a state in which the wick support member 40 is inserted into the inside of the drain hole 2*a* of the flower pot 2. Therefore, it is possible to supplement the support force of the support rib 12 supporting the flower pot 2.

One side of the wick support member 40 may be cut out in a longitudinal direction through a cut-out portion 41. The wick support member 40 may be provided in a bar shape with an open top and thus the wick support member 40 may be fixed to the upper cover 51 in a position of standing straight.

Therefore, as one end of the wick 30 is inserted into to the wick support member 40, the wick 30 together with the wick support member 40 may be inserted to the inside of the flower pot 2 through the drain hole 2*a*. As the other of the wick 30 extends to the lower portion of the main body 10, the wick 30 may supply water to the soil in the flower pot 2 by absorbing the water in the lower portion of the main body 10.

Alternatively, the wick support member 40 may be variously modified as long as the wick support member 40 is configured to be inserted into the inside of the soil of the flower pot 2 through the drain hole 2*a* while supporting the wick 30. For example, the wick support member 40 may be provided in a bar shape that includes a hook to lock the wick 30 to the circumference of the wick support member 40.

Figure 2:
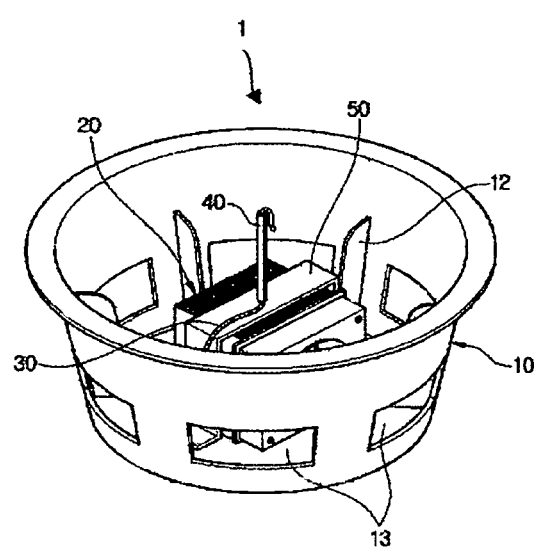
FIG. 2 is a perspective view of the flower water receiver according to one embodiment of the present disclosure.
Figure 3:
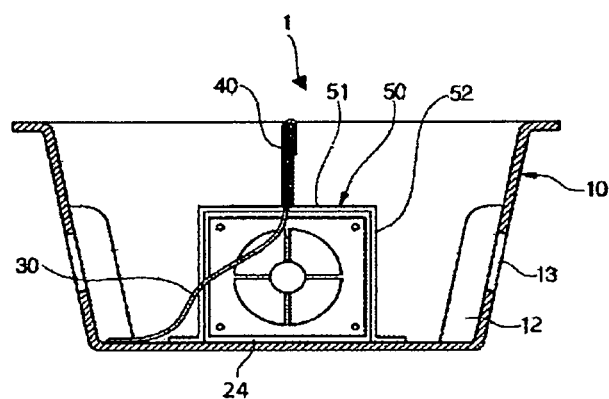
FIG. 3 is a cross-sectional view of the flower water receiver according to one embodiment of the present disclosure.

As illustrated in FIGS. 2 and 3, in order to place the flower pot 2 to the flower water receiver 1 for watering the flower pot 2, one end of the wick 30 may be supported against the wick support member 40 and then the other end of the wick 30 may be placed on the bottom of the main body 10.

Figure 4:
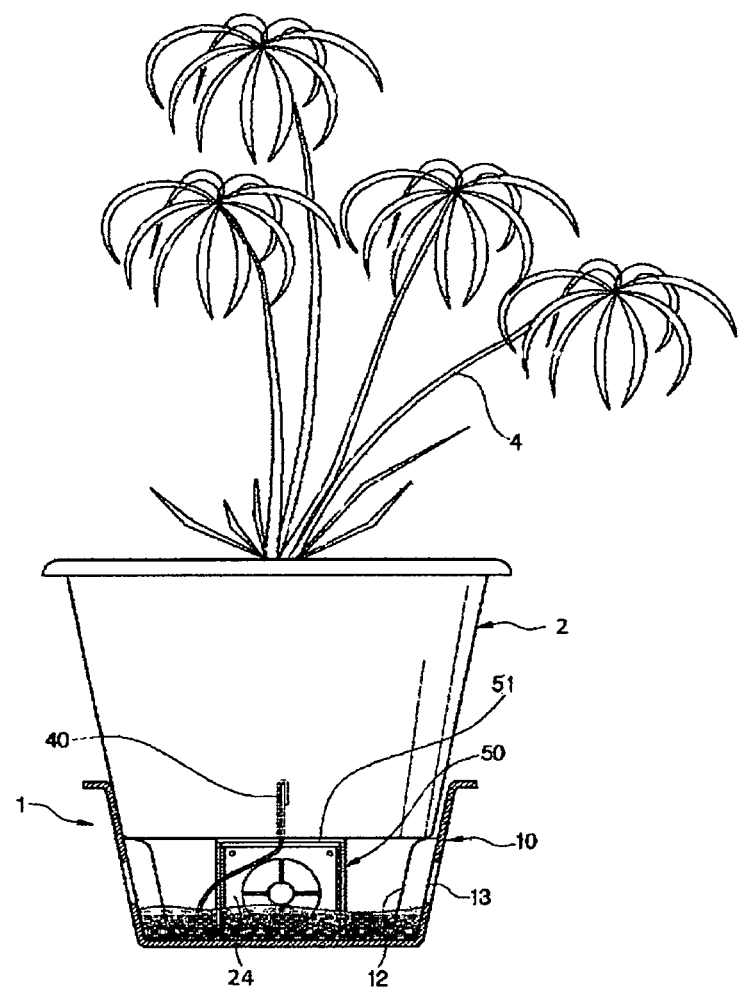
FIG. 4 is a view illustrating a state in which the flower water receiver is utilized according to one embodiment of the present disclosure, particularly illustrating a state in which a flower pot is positioned in an upper portion of the flower water receiver.
Figure 5:
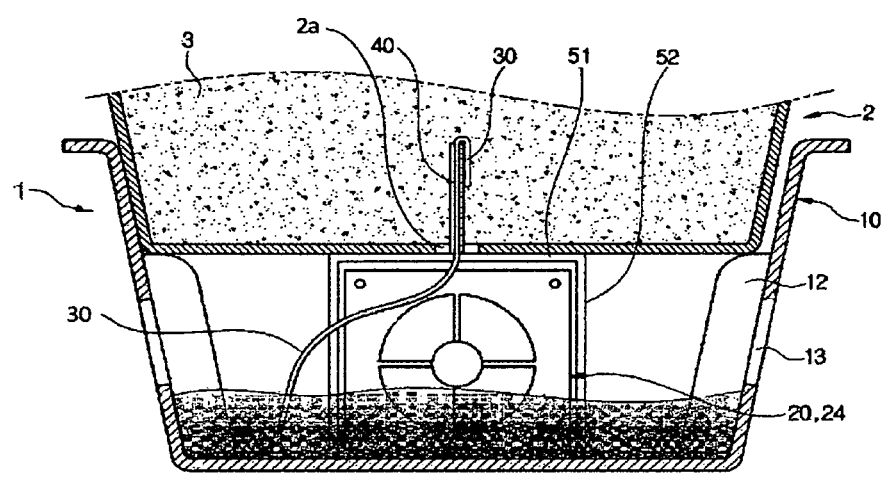
FIG. 5 is a cross-sectional view of a main part of FIG. 4.

As illustrated in FIGS. 4 to 5, the flower pot 2 may be placed in the upper portion of the main body 10 in such a way that the circumference of the lower portion of the flower pot 2, in which the soil 3 is filled and a plant 4 is planted, is supported by the support rib 12. In this time, the wick support member 40 may be inserted into the soil 3 in the flower pot 2 through the drain hole 2*a* of the flower pot 2 and thus the one end of the wick 30 may be placed in the soil 3 of the flower pot 2.

Accordingly, when the self-watering module 20 is driven, the thermo element 21 and the cooling fan 24 may be driven and thus the cooling member 22 may be cooled by the heat radiating portion in which the endothermic reaction occurs.

As the heat radiating member 23 radiates heat by being cooled by the cooling fan 24, moisture in the air may be condensed on the surface of the flower pot 22, and thus the water may be formed.

The water formed on the surface of the cooling member 22 may be guided to the lower side along the surface of the cooling fin 22*b* and stored in the lower portion of the inside of the main body 10 by its own weight. The water stored in the lower portion of the main body 10 may be transferred to the soil 3 of the flower pot 2 through the absorption action of the wick 30, and then absorbed by the root of the plant 4.

The invention claimed is:

1. A flower water receiver comprising:
a main body formed in a cylindrical shape with an open top so as to store water;
a self-watering module installed on a central portion of a bottom of the main body to form water by condensing moisture in air;
a support formed on a part of the main body in the vicinity of a circumference of the self-watering module so as to support a circumference of a lower portion of a flower pot placed in an upper portion of the main body; and
a wick support member supporting a wick configured to absorb water in the lower portion of the main body and transfer the water to the inside of the flower pot, and configured to be inserted into an inside of a drain hole in a central portion of the lower portion of the flower pot,
wherein a plurality of vent holes are formed on a side circumferential surface of the main body of the flower water receiver to supply the air to the self-watering module through the plurality of vent holes.

2. The flower water receiver of claim 1, wherein
the support comprises a plurality of support ribs configure to protrude from the bottom of the main body, which is in the vicinity of the circumference of the self-watering module, to the upper side to extend radially outward from the inside, and arranged to be spaced apart from each other in a circumferential direction.

3. The flower water receiver of claim 1, further comprising:
a fixing bracket configured to cover at least one portion of the self-watering module so as to fix the self-watering module to the bottom of the main body,
wherein the wick support member is integrally fixed to the fixing bracket.

4. The flower water receiver of claim 3, wherein
the fixing bracket comprises an upper cover configured to cover at least one portion of an upper portion of the self-watering module,
wherein the wick support member is fixed to the upper cover, and the upper cover in the vicinity of a circumference of the wick support member supports the lower portion of the flower pot in the vicinity of the drain hole.

5. The flower water receiver of claim 1, wherein
the self-watering module comprises
a thermo element;
a cooling member provided in a cooling portion of the thermo element;
a heat radiating member provided in a heat radiating portion of the thermo element; and
a cooling fan configured to cool the heat radiating member.

6. The flower water receiver of claim 1, further comprising a fixing bracket fixed to the bottom of the main body and covering at least a part of the self-watering module, wherein the wick support member is fixed to the fixing bracket.

7. The flower water receiver of claim 6, wherein the fixing bracket comprises a pair of bottom supports between which the self-watering module disposed and an upper cover covering at least a part of an upper portion of the self-watering module.

* * * * *